United States Patent [19]

George

[11] Patent Number: 5,284,904
[45] Date of Patent: Feb. 8, 1994

[54] LOW THERMAL EXPANSION POLYIMIDE COMPOSITIONS

[75] Inventor: Daniel E. George, Chadds Ford, Pa.

[73] Assignee: E. I. Du Pont de Nemours and Company, Wilmington, Del.

[21] Appl. No.: 66,731

[22] Filed: May 27, 1993

[51] Int. Cl.$^5$ .................. C08G 8/02; C08G 12/00; C08G 69/26
[52] U.S. Cl. ...................................... 524/600; 524/442
[58] Field of Search ............................ 524/600, 442

[56] References Cited

U.S. PATENT DOCUMENTS

| | | | |
|---|---|---|---|
| 3,179,614 | 4/1965 | Edwards | 260/30.2 |
| 4,238,538 | 11/1982 | Manwiller | 264/331 |
| 4,360,626 | 11/1982 | Manwiller | 524/600 |
| 4,937,310 | 6/1990 | Hayashi et al. | 524/601 |
| 4,983,713 | 1/1991 | Hayashi et al. | 524/604 |
| 5,132,394 | 7/1992 | Bockrath | 524/494 |

*Primary Examiner*—Morton Foelak

[57] ABSTRACT

Polyimide compositions containing graphite and wollastonite exhibit an unusual combination of low wear and friction and low coefficient of thermal expansion.

8 Claims, No Drawings

LOW THERMAL EXPANSION POLYIMIDE COMPOSITIONS

BACKGROUND OF THE INVENTION

Polyimides, such as those described in Edwards, U.S. Pat. No. 3,179,614, can be used in a wide variety of commercial applications. The outstanding performance characteristics of these polymers under stress and at high temperatures have made them useful in the form of bushings, seals, electrical insulators, compressor vanes and impellers, pistons and piston rings, gears, thread guides, cams, brake linings, and clutch faces.

It is often desirable to incorporate various additives in such polyimide compositions before fabrication into their final form. Accordingly, graphite has been incorporated to improve the wear characteristics in bearing applications. Diamonds have been incorporated for abrasive applications. Fluoropolymers have been incorporated in the past for lubricity in forming and extrusion of shapes.

Despite the variety of polyimides and additives that have previously been available, a continuing need for polyimide compositions, particularly when processed into the shape of bushings and bearings, is a reduction in the thermal expansion of such materials. In bushings and bearings, close clearances to adjacent metal surfaces are needed, in combination with excellent wear characteristics. In the past, while additives could be incorporated for the reduction of wear, it has previous not been possible to prepare a polyimide composition having both low wear and friction performance and a low coefficient of thermal expansion.

SUMMARY OF THE INVENTION

The present invention provides polyimide compositions containing graphite and a fibrous inorganic filler which exhibits greatly reduced thermal expansion compared with the same composition containing no fibrous filler. The compositions also exhibit low wear and friction performance against a steel mating surface, equivalent to the same composition containing no fibrous inorganic filler.

Specifically, the present invention provides a polyimide composition consisting essentially of complemental quantities of about 25-65 parts of at least one polyimide, about 25-45 parts by weight of graphite powder, and about 10-30 parts by weight of wollastonite.

DETAILED DESCRIPTION OF THE INVENTION

The compositions of the present invention contain about 25-65 parts by weight of at least one polyimide, and preferably about 35-55 wt %. Parts by weight, in the present invention, are indicated as parts per 100 parts of the combination of polyimide, graphite, and wollastonite. A wide variety of polyimides can be used, including those described in Edwards, U.S. Pat. No. 3,179,614, hereby incorporated by reference. The polyimides described therein are prepared from at least one diamine and at least one anhydride. Preferred diamines which can be used include m-phenylene diamine (MPD), p-phenylene diamine (PPD), oxydianiline (ODA), methylene dianiline (MDA) and toluene diamine (TDA). Preferred anhydrides which can be used include benzophenone tetracarboxylic dianhydride (BTDA), biphenyl dianhydride (BPDA), trimellitic anhydride (TMA), pyromellitic dianhydride (PMDA), maleic anhydride (MA) and nadic anhydride (NA).

Preferred polyimides which can be used in the present invention include those prepared from the following combinations of anhydride and diamine: BTDA-MPD, MA-MDA, BTDA-TDA-MDA, BTDA-MDA-NA, TMA-MPD & TMA-ODA, BPDA-ODA & BPDA-PPD, BTDA-4,4'-diaminobenzophenone, and BTDA-bis(p-aminophenoxy)-p,p'-biphenyl. An especially satisfactory polyimide in the present invention is that prepared from pryomellitic dianhydride and 4,4'-oxydianiline.

The polyimide compositions of the present invention also contain about 25-45 parts by weight graphite powder. Less than about 25 wt % of the graphite will not provide the frictional properties required for bushing and bearing applications. Greater than about 45% will result in a depreciation of the structural integrity of the final product and loss of the outstanding mechanical properties for which polyimides are noted. Preferably, the graphite comprises about 30-40 wt. %.

Particularly preferred graphites which can be used in the present invention are those which are substantially free from reactive impurities, that is, those impurities which have an adverse effect on the oxidative stability of blends with polyimides. In general, the graphite should have less than about 0.15 weight percent of such reactive impurities, and preferably less than about 0.10 weight percent. Typical of such reactive impurities are metal oxides and sulfides, and particularly ferric sulfide, barium sulfide, calcium sulfide, copper sulfide, barium oxide, calcium oxide, and copper oxide.

A central feature of the present invention is the incorporation of about 10-30 parts by weight of wollastonite, or acicular calcium silicate. As little as 10 wt % of the wollastonite incorporated into the polyimide composition will significantly reduce the coefficient of linear thermal expansion compared with a graphite/polyimide composition. In addition, the composition, tested against a steel mating surface, shows wear and friction performance equivalent to the graphite/polyimide composition, even at high PV (pressure×velocity) conditions. Greater than 30 parts by weight of the wollastonite imparts no significant additional benefit to the polyimide compositions, and can depreciate the overall mechanical properties of parts made from these compositions. Preferably, about 15-25 wt % wollastonite is used.

Wollastonite which can be used in the present invention is a natural mineral found in the form of needles, having the general composition $CaSiO_3$. In general, the needles have a diameter of about 25 micrometers and a length of about 400 micrometers.

The present compositions can further comprise up to about 10 wt % of other additives, fillers and dry lubricants which do not depreciate the overall performance characteristics of the finished polyimide parts, as will be evident to those skilled in the art. Typical of such additional additives are tungsten disulfide and molybdenum disulfide.

In the preparation of the present compositions, the order of addition is not critical. The three basic components, the polyimide, the graphite and the wollastonite, can be blended using conventional milling techniques in the required quantities. In the alternative, some commercially available polyimides contain encapsulated graphite, to which additional graphite can be added by conventional blending techniques, if desired. The graphite and wollastonite can also be conveniently incorporated into the polyimide, as an alternative to milling techniques, by blending into the polymer solution of the polyimide precursors prior to precipitation as the polyimide. This lattermost preparation technique is preferred.

The polyimide compositions of the present invention, when processed into parts, are suitable for providing wear surfaces in the form of bushings and bearings where close clearances to adjacent metal surfaces are needed. This includes a multitude of small motor bearings. Parts formed from the present compositions exhibit a reduced coefficient of linear thermal expansion by as much as 50% compared with a graphite/polyimide composition. In addition, the composition, tested against a steel mating surface, shows wear and friction performance equivalent to the graphite/polyimide composition, even at high PV (pressure×velocity) conditions. The reduction of expansion coefficient exhibited by compositions of the present invention, while maintaining good wear and friction, appears to be unique in the wollastonite/graphite/polyimide formulation. Other fibrous fillers, when incorporated into the relatively hard graphite/polyimide composition, also lower thermal expansion by equivalent amounts, but they are abrasive in nature, causing high friction and excessive wear to the polyimide composition and to the steel mating surface. It is surprising, therefore, that the wollastonite performs well when used in the range within the scope of this invention.

In each of the following examples, polyimide resins were prepared from pryromellitic dianhydride and 4,4'-oxydianiline, according to the procedures of U.S. Pat. No. 3,179,614. The indicated quantities of graphite powder and wollastonite or other fibrous filler were incorporated into the polymer solution prior to precipitation as the polyimide.

The resulting filled polyimide resin powder was converted into test specimens by direct forming at a pressure of 1000,000 psi (689 MPa) at room temperature. The resulting parts were sintered for three hours at 400 degrees C. under nitrogen at atmospheric pressure. After cooling to room temperature, the parts were machined to final dimensions for test specimens. The 0.25" wide contact surface of the wear/friction test block was machined to such a curvature that it conformed to the outer circumference of the 1.375" diameter×0.375" wide metal mating ring. The blocks were oven dried and maintained dry over desiccant until tested.

The wear tests were performed using a Falex No. 1 Ring and Block Wear and Friction Tester. The equipment is described in ASTM test method D2714. The polyimide block was mounted against the rotating metal ring and loaded against it with the selected test pressure. For all the tests the load was 30 pounds or 192 psi (1.34 MPa), and the rotational velocity of the ring was 725 rpm or 260 feet per minute (fpm) (1.32 meters per second), giving a PV of about 50,000 psi-fpm. No lubricant was used between the mating surfaces. The rings were SAE 4620 steel, Rc 58-63, 6-12 RMS. A new ring was used for each test. The time of each test was 24 hours, except where wear was exceptionally high.

The coefficient of linear thermal expansion was determined by thermomechanical analyzer according to ASTM E831. On each specimen it was measured in the direction perpendicular to the direction of forming pressure when the part was made.

EXAMPLES 1 TO 6 COMPARATIVE EXAMPLES A AND B

Compositions were prepared and tested as summarized in Table I.

Examples 1 through 6, show the effect of increasing wollastonite content on reducing the coefficient of linear thermal expansion compared with Comparative Example A which contains no wollastonite. Examples 1 through 4 also show that wear resistance of the material as well as that of the mating steel is best when the graphite content is high compared with Comparative Example B which has low graphite content.

EXAMPLE 7 AND COMPARATIVE EXAMPLES C TO G

Compositions were prepared and tested as summarized in Table II.

Example 7, Table II, shows the typical results with 25 wt % wollastonite and 37 wt % graphite. Comparative Example C shows that equal or better wear and friction results were obtained by using gypsum fiber at the same volume loading of fiber and graphite. However, this filler is inferior in its effectiveness in reducing thermal expansion.

Comparative Examples D through G have fibers which are effective in lowering expansion, but which give inferior wear and friction performance compared with wollastonite at the same volume loading.

EXAMPLE 8 AND COMPARATIVE EXAMPLE H

Compositions were prepared and tested as summarized in Table III.

Example 8 is the typical result with 21 wt % wollastonite and 37 wt % graphite. Comparative Example H shows that essentially equivalent thermal expansion may be achieved with the gypsum fiber if the latter is increased in content to 35 wt %. Good wear performance by the gypsum is maintained; however, tensile properties are unacceptably low compared with the wollastonite composition in Example 8.

TABLE I

| No. | Wollastonite wt % (vol %) | Graphite wt % (vol %) | COEFF of Exp um/m-C 35-300C | WEAR ccx10−4 per hr | Avg COEFF FRICT | STEEL WEAR ccx10−6 per hr |
|---|---|---|---|---|---|---|
| 1 | 10.0 (6.0) | 33.3 (25.5) | 23.0 | 4.6 | 0.19 | 2.1 |
| 2 | 20.0 (12.5) | 29.6 (23.9) | 18.5 | 4.8 | 0.17 | 3.7 |
| 3 | 20.0 (12.9) | 37.0 (30.7) | 16.0 | 4.0 | 0.17 | 1.6 |
| 4 | 25.0 (16.7) | 37.0 (31.8) | 15.0 | 4.7 | 0.16 | 3.7 |
| 5 | 30.0 (19.6) | 25.9 (21.8) | 18.0 | 10.0 | 0.18 | 6.9 |

TABLE I-continued

| No. | Wollastonite wt % (vol %) | Graphite wt % (vol %) | COEFF of Exp um/m-C 35-300C | WEAR ccx10−4 per hr | Avg COEFF FRICT | STEEL WEAR ccx10−6 per hr |
|---|---|---|---|---|---|---|
| 6 | 30.0 (20.7) | 37.0 (32.9) | 14.5 | 6.9 | 0.17 | 4.8 |
| A | — | 37.0 (27.1) | 29.0 | 3.5 | 0.16 | 1.1 |
| B | 21.0 (12.5) | 15.0 (11.4) | | 13.4 | 0.23 | 12.2 |

TABLE II

| NO. | FILLER TYPE | FILLER WT % (VOL %) | GRAPHITE WT % (VOL %) | COEFF OF EXP um/m-C 35-300C | WEAR ccx10−4 PER HR | AVG COEFF FRICT | STEEL WEAR ccx10−6 PER HR |
|---|---|---|---|---|---|---|---|
| 7 | WOL | 25.0(16.7) | 37.0(31.8) | 15.0 | 4.7 | 0.16 | 3.7 |
| C | GYP | 25.3(16.5) | 36.6(31.9) | 23.0 | 4.5 | 0.12 | 0.0 |
| D | KTI | 28.9(16.7) | 35.0(31.8) | 17.0 | 8.9 | 0.24 | 13.3 |
| E | CF | 16.7(16.5) | 41.0(31.5) | 11.0 | 40.7 | 0.69 | |
| F | GF | 18.3(16.5) | 40.2(31.9) | 17.0 | 5.8 | 0.19 | 4.3 |
| G | CER | 20.0(13.7) | 37.0(30.8) | 21.0 | 55.5 | 0.41 | 246.9 |

WOL = Wollastonite Fiber, Calcium Silicate, average length approx 365 um, diameter approx 23 um. NYAD G, NYCO Minerals, Inc.
GYP = Gypsum Fiber, Calcium Sulfate, average length approx 140 um, diameter approx 6.5 um. Franklin Fiber A-30, United States Gypsum Company
KTI = Potassium Titanate Fiber, average length approx 425 um, diameter approx 45 um. TXAX-A, Kubota Company
CF = Carbon Fiber, average length approx 140 um, diameter 6 um. Torayca MLD-300, Toray Company
GF = Glass Fiber, average length approx 210 um, diameter approx 12 um
CER = Ceramic Fiber, aluminosilicate, Fiberfrax CEF 101, Carborundum Company

TABLE III

| NO. | FILLER TYPE | FILLER WT % | GRAPHITE WT % | COEFF OF EXP um/m-C 35-300C | WEAR ccx10−4 PER HR | AVG COEFF FRICT | STEEL ccx10−6 PER HR | TENS STRENGTH/ ELONG psi/% |
|---|---|---|---|---|---|---|---|---|
| 8 | WOL | 21 | 37 | 16 | 4.0 | 0.17 | 3.2 | 5350/0.8 |
| H | GYP | 35 | 37 | 17 | 4.8 | 0.13 | 0.0 | 3640/0.3 |

I claim:

1. A polyimide composition consisting essentially of complemental quantities of about 25-65 parts by weight of at least one polyimide, about 25-45 parts by weight of graphite powder, and about 10-30 parts by weight of wollastonite.

2. A polyimide composition of claim 1 wherein the polyimide consists essentially of a single polyimide.

3. A polyimide composition of claim 1 wherein the polyimide consists essentially of polymer prepared from pyromellitic dianhydride and 4,4'-oxydianiline.

4. A polyimide composition of claim 1 wherein the graphite is substantially free from reactive impurities.

5. A polyimide composition of claim 1 further comprising up to about 10% of other additives.

6. A polyimide composition of claim 1 having about 30-40 wt % graphite.

7. A polyimide composition of claim 1 having about 15-25 wt % wollastonite.

8. A polyimide composition consisting essentially of complemental quantities of about 35-55 parts by weight of at least one polyimide, about 30-40 parts by weight of graphite powder, and about 15-25 parts by weight of wollastonite.

* * * * *